(12) United States Patent
Munter et al.

(10) Patent No.: US 7,184,431 B2
(45) Date of Patent: Feb. 27, 2007

(54) ROTATOR COMMUNICATION SWITCH HAVING REDUNDANT ELEMENTS

(75) Inventors: Ernst A. Munter, Kanata (CA); Delfin Y. Montuno, Kanata (CA); James Aweya, Nepean (CA)

(73) Assignee: Nortel Networks Limited, St. Laurent (CA)

( * ) Notice: Subject to any disclaimer, the term of this patent is extended or adjusted under 35 U.S.C. 154(b) by 1036 days.

(21) Appl. No.: 09/954,192

(22) Filed: Sep. 18, 2001

(65) Prior Publication Data

US 2003/0053417 A1  Mar. 20, 2003

(51) Int. Cl.
*H04L 12/50* (2006.01)

(52) U.S. Cl. .................. 370/360; 370/412; 370/231; 370/235

(58) Field of Classification Search ......... 370/412–418
See application file for complete search history.

(56) References Cited

U.S. PATENT DOCUMENTS

| | | | |
|---|---|---|---|
| 4,470,139 A | 9/1984 | Munter | 370/66 |
| 4,494,230 A | 1/1985 | Turner | 370/60 |
| 5,168,492 A | 12/1992 | Beshai et al. | 370/60.1 |
| 5,745,486 A * | 4/1998 | Beshai et al. | 370/395.71 |
| 5,850,389 A * | 12/1998 | Wesler | 370/325 |
| 6,075,767 A | 6/2000 | Sakamoto et al. | 370/228 |
| 6,091,730 A | 7/2000 | Biegaj et al. | 370/395 |
| 6,091,731 A | 7/2000 | Biegaj et al. | 370/395 |
| 6,307,852 B1 * | 10/2001 | Fisher et al. | 370/352 |
| 7,009,964 B2 * | 3/2006 | Fisher et al. | 370/363 |

* cited by examiner

*Primary Examiner*—Seema S. Rao
*Assistant Examiner*—Michael J. Moore

(57) ABSTRACT

A rotator switch includes active and redundant tandem buffers used to switch information units through the switch. The tandem buffers are interconnected to inputs and outputs by way of commutators. Information provided to one or more of the active buffers is provided to a redundant buffer. If an active tandem buffer fails, the switch may use the redundant buffer in place of the failed active buffer. A further rotator switch is formed using a plurality of switching blocks. Each switching block includes its own set of tandem buffers, and ingress and egress commutators to interconnect the tandem buffers to inputs and outputs. The plurality of switching blocks is interconnected using additional commutators. At least one of these switching blocks is redundant and is provided with information provided to an active switching block. In the event of failure of an active block, the switch may use a redundant switching block in place of the failed or replaced active block.

15 Claims, 12 Drawing Sheets

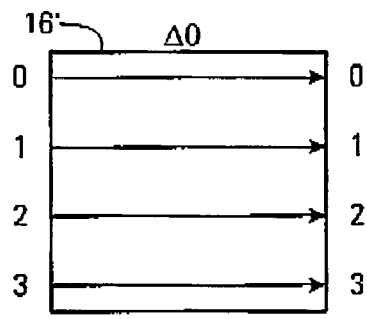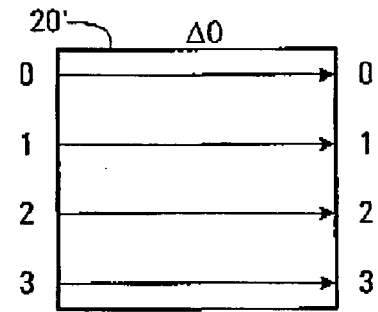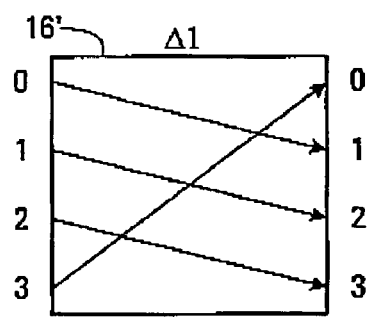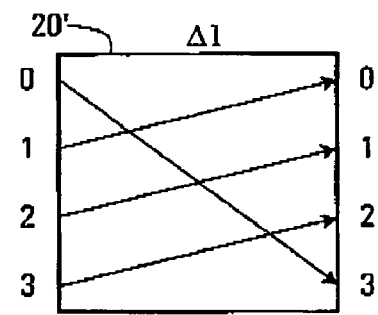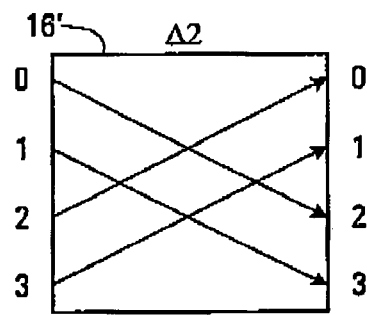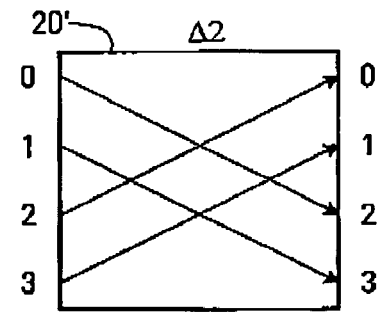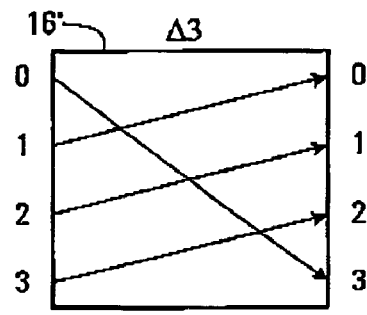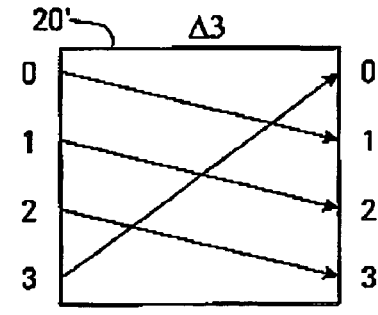
FIG. 4A
(Prior Art)
FIG. 4B
(Prior Art)

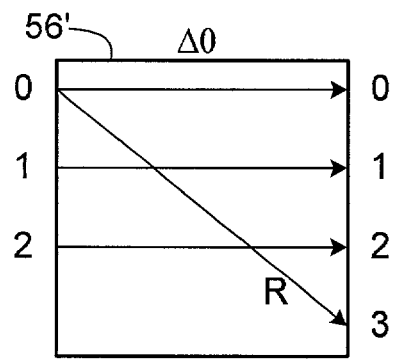
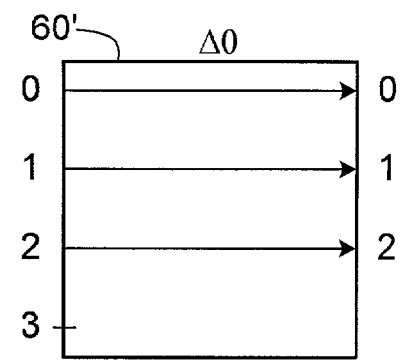
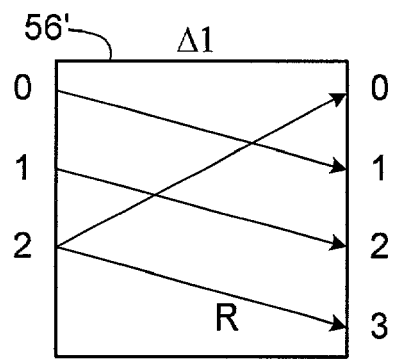
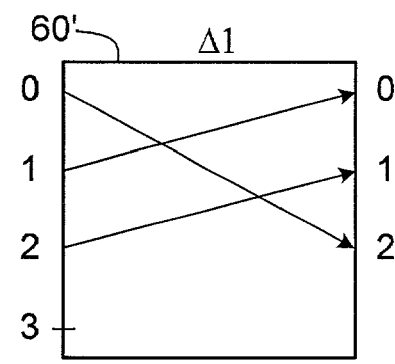
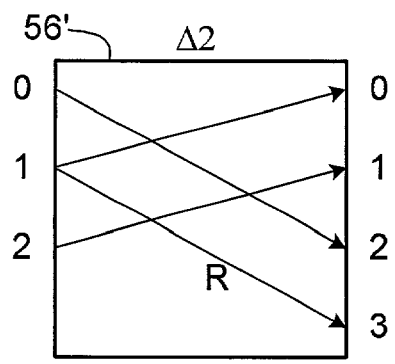
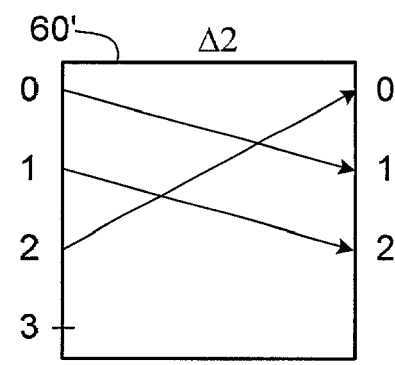
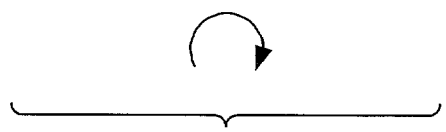
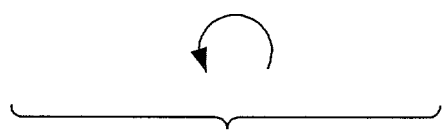
FIG. 9A
FIG. 9B

ROTATOR COMMUNICATION SWITCH HAVING REDUNDANT ELEMENTS

FIELD OF THE INVENTION

The present invention relates generally to communication switches, and more specifically, to rotator switches including redundant elements.

BACKGROUND OF THE INVENTION

In communication networks, information in the form of data is typically passed between endpoints. In order to achieve this, the data is often routed using one or more switches. Conventional switches may be used to establish circuits across the network or to route data units, typically formed as packets. Known circuit switches include space division switches, time multiplexed switches, S-T-S (space-time-space) switches; and T-S-T (time-space-time) switches. Known packet switches include asynchronous transfer mode (ATM) switches; internet protocol (IP) routers; and the like.

Both circuits and packets may be switched using a switch having buffers cyclically interconnected to inputs and outputs by way of commutators. Such switches are referred to as rotator switches. Example rotator switches are described in U.S. Pat. No. 4,470,139, entitled Switching Network For Use In a Time Division Network and U.S. Pat. No. 5,168,492, entitled Rotating-Access ATM-STM Packet Switch, the contents of both of which are incorporated herein by reference.

Conventional rotator switches transfer data at a plurality of inputs to tandem buffers each having multiple storage locations. At any time, each input and each output is interconnected with a single buffer. The interconnections of inputs to buffers, and outputs to buffers are cycled synchronously so that each buffer is interconnected with each input and each output once in a rotator cycle. Each output is associated with a specific storage location in each buffer. The storage location for any one output is typically the same for all buffers. Data at an input may quickly be transferred to a destination output by transferring the data to the tandem buffer currently interconnected with the input in the storage location associated with the destination output, if this storage location is available. When this tandem buffer is next connected to the destined output, the output receives this data. Thus, a non-blocking n×m circuit switch may readily be formed with n buffers, each including m storage locations.

In a rotator switch that switches packets, the storage location associated with the destination output for any one packet may not be available. As such, rotator switches suited to switch packets may queue packets until a tandem buffer whose storage location associated with this destination is available is interconnected. Conveniently, rotator switches used to switch packets typically include more buffers than inputs and outputs. They also cycle inputs to buffers and outputs to buffers at a higher rate than the rate at which packets arrive. So, with a proper number of tandem buffers there is limited delay in switching the data. This is detailed in the above noted U.S. Pat. No. 5,168,492.

Many conventional switches also include redundant hardware. In this manner, if a fault occurs, redundant hardware may be used in place of the failed hardware. Typical rotator switches, however, do not include redundant elements. Though, rotator switches used to switch packets do typically include more buffers than inputs and outputs. For such switches, a failed buffer can simply not be used. This reduces the efficiency of the switch. Rotator switches used to switch circuits, however, typically include just enough buffers to route data from inputs to outputs. As such, absent other error or fault control mechanisms, once a fault occurs at an input, output or within a buffer of a rotator switch, there is little opportunity to recover from the fault without operator intervention.

Accordingly, there is a need for an improved rotator switch including one or more redundant elements that is capable of reacting to faults within the switch.

SUMMARY OF THE INVENTION

In accordance with the present invention, a rotator switch includes active and redundant tandem buffers used to switch information units through the switch. The tandem buffers are interconnected to inputs and outputs by way of commutators. Information provided to one or more of the active buffers is provided to a redundant buffer. If an active tandem buffer fails, the switch may use the redundant buffer in place of the failed active buffer.

In accordance with another aspect of the present invention, a rotator switch is formed using a plurality of switching blocks. Each switching block includes its own set of tandem buffers, and ingress and egress commutators to interconnect the tandem buffers to inputs and outputs. The plurality of switching blocks is interconnected using additional commutators. At least one of these switching blocks is redundant and is provided with information provided to at least one active switching block. In the event of failure of an active block, the switch may use the redundant switching block in place of the failed or replaced active block.

According to an aspect of the present invention, there is provided a communications switch for switching information units between inputs and outputs. This switch includes p inputs each for receiving information units; q outputs; p+l buffers, each of the information buffers comprising q storage locations, each one of the storage locations for storing one of the information units. P of these information buffers are active information buffers, and l of these information buffers are redundant information buffers. An ingress commutator interconnects each of the p inputs to at least one of the p+l buffers. An egress commutator similarly interconnects each of the q outputs to a select one of the p+l buffers. The ingress commutator cyclically interconnects each of the p inputs to each of the p active information buffers to provide data from the each of the p inputs to the p active information buffers, and to interconnect one of the l redundant information buffers the p inputs to replicate data in one of the p active buffers within this redundant buffer. The egress commutator interconnects each of the q outputs to one of the p+l information buffers to provide data from the p inputs to the q outputs.

According to another aspect of the present invention, a communications switch for switching information units between inputs and outputs includes h+z switching blocks. Each of these h+z switching blocks includes h inputs; h outputs; and h buffers. Each of the buffers includes h storage locations, each for storing one of the information units. An ingress commutator cyclically interconnects each of the h inputs of a switching block, to one of its h buffers. An egress commutator cyclically interconnects each of the h buffers to one of its h outputs. The switch further includes h outer ingress commutators, each having h inputs, h active outputs and z redundant outputs. As well, the switch includes h outer egress commutators, each having h outputs, h active inputs, and z redundant inputs. Each of the h active outputs of the h outer commutators, connects to one input of one of the h+z switching blocks. Each redundant output of each of the h outer ingress commutators connects to one input of a remaining one of the h+z switching blocks. Each of the h active inputs of each of the outer egress commutators interconnected with an output of one of the h+z switching blocks. Each of the z redundant inputs of each of the h outer egress commutators is connected to one of the h outputs of the remaining ones of the h+z switching blocks. The h outer ingress commutators are operable to provide data to the remaining ones of the switching blocks, that duplicates data provided to another one of the h+z switching blocks.

In accordance with yet another aspect of the present invention, a commutator includes p inputs; p+l outputs; and an interconnect, between the p inputs and the p+l outputs. The interconnect presents the p inputs at p active outputs of the p+l outputs, and l of the p inputs at l of the p+l outputs. The interconnect is operable to cycle the p inputs amongst the p active outputs.

In accordance with yet another aspect of the present invention, there is provided a method of switching data between p inputs and q outputs. The method includes loading data from the p inputs into p active tandem buffers, each of the active tandem buffers comprising q storage locations; unloading one location of each of the p tandem buffers at one of the q outputs to switch the data; and loading data from l of the p inputs into l redundant tandem buffers, each of the l redundant buffers comprising q storage locations, to mirror data in l of the p active tandem buffers.

Other aspects and features of the present invention will become apparent to those ordinarily skilled in the art upon review of the following description of a specific embodiment of the invention in conjunction with the accompanying figures.

BRIEF DESCRIPTION OF THE DRAWINGS

In the following figures which illustrate, by way of example only, embodiments of the invention:

FIGS. 4A–4B illustrate components of the switch of FIG. 3, in operation;

FIGS. 9A–9B illustrate components of the switch of FIG. 8, in operation;

DETAILED DESCRIPTION

Figure 1:
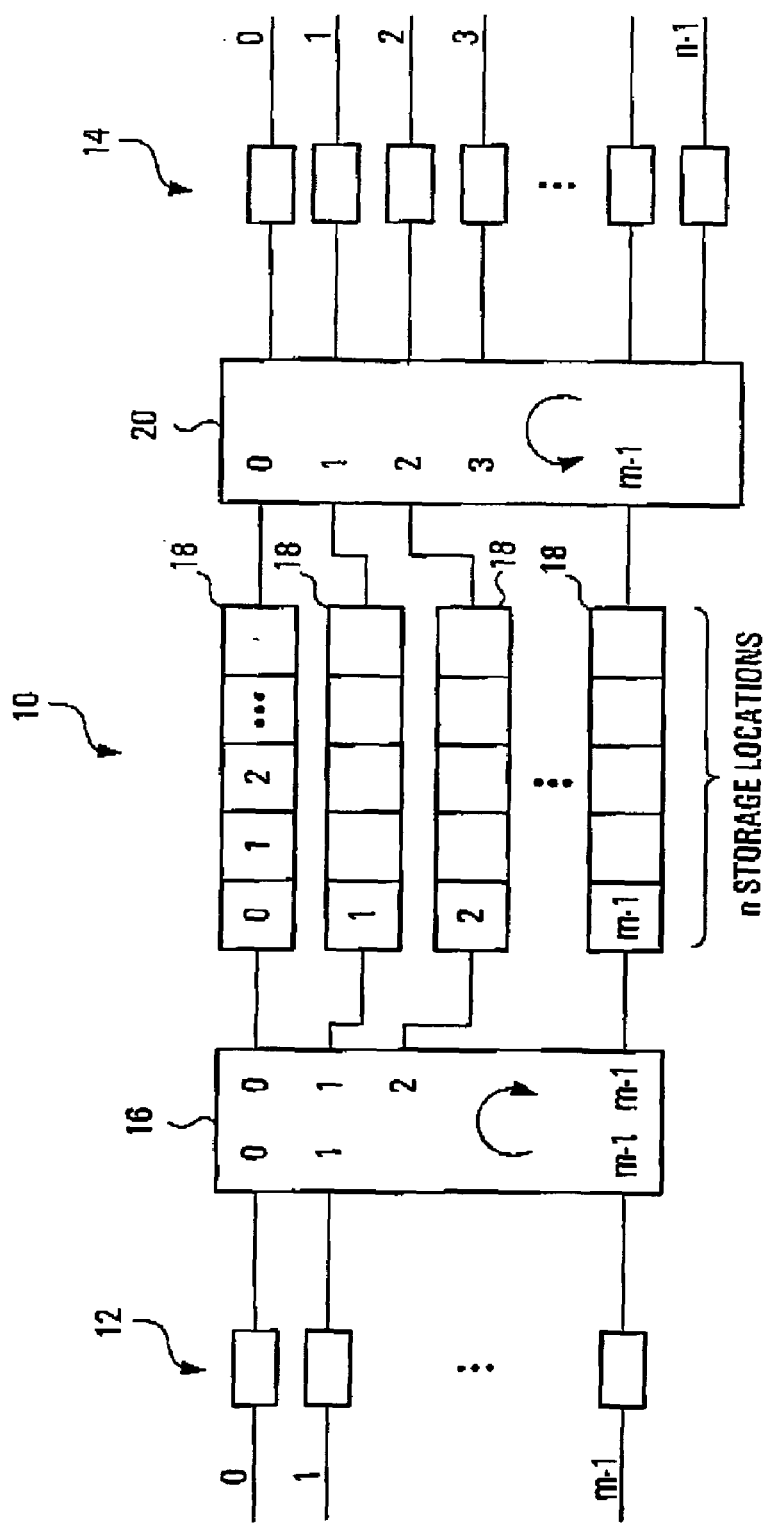
FIG. 1 is a block diagram of a conventional rotator switch.

FIG.1 schematically illustrates a conventional rotator switch 10. Switch 10 may switch data from a plurality of m input buffers 12 to a plurality of n output buffers 14. Switch 10, includes in flow communication input buffers 12; ingress commutator 16; a plurality of n tandem buffers 18; egress commutator 20; and output buffers 14.

Suitably adapted a switch like switch 10 may act as an internet protocol (IP) router; an asynchronous transfer mode (ATM) switch; or a time-division multiplexed, circuit switch, or the like. Depending on the particular nature of switch 10, switch 10 may be used to switch data in timeslots; packets; ATM cells, or the like.

Input buffers 12 and output buffers 14 are first-in, first-out store and forward buffers, each in communication with a data link, such as an optical telecommunications fiber; a telephony trunk; or the like, by way of a suitable data formatting circuit. Each data formatting circuit (not shown) receives data from the data link in its native format and converts it to a format suitable for switching through switch 10. For example, if switch 10 is adapted to switch ATM cells, the data formatting circuits may encapsulate received ATM cells. If switch 10 switches time division multiplexed telephony data, the data formatting circuits may combine one or more TDM octets of TDM data, and encapsulate these. The number of octets encapsulated together will depend on the granularity of switch 10. A complementary data formatting circuit (not shown) is associated with each output buffer 14 and may de-encapsulate the encapsulated data. A unit of data switched through switch 10 is hereinafter referred to as an information unit.

Ingress commutator 16 has m inputs and m outputs, and may be best described as an m-state interconnect. In each of its m states, each of the m inputs is connected to one of the m outputs. Although each input may be connected to any output, all m sequential inputs are presented at m sequential outputs, in the order of the inputs. The state of the commutator controls the offset between inputs and outputs. An offset of 0 or an integer multiple of m will cause the kth input to be connected to the kth output. An offset of j will cause the kth input to be connected to the (k+j mod m)th output. An ingress commutator 16 is therefore said to have a commutator cycle equal to m clock cycles. Egress commutator 20 is similarly an n state m×n interconnect. It has at least m inputs and n outputs, and therefore has a commutator cycle of n clock cycles. Ingress and egress commutators may be formed in any number of ways understood by those of ordinary skill.

Ingress and egress commutator are operated cyclically: each input is interconnected with each output for one clock cycle by an associated interconnect. Upon transition of a clock cycle each input is interconnected to the next output. Mathematically, upon transition of a time interval from $\Delta x$ to $\Delta x+1$, the kth output of ingress commutator 16, previously interconnected to the jth input of ingress commutator 16, is interconnected to the (j+1)th input. The output previously interconnected with the (m−1)th input is interconnected with the $0^{th}$ input. That is, $$\text{output}k[\Delta x+1]=\{(\text{ouput}k[\Delta x]+1)\bmod m\}$$

Figure 2:
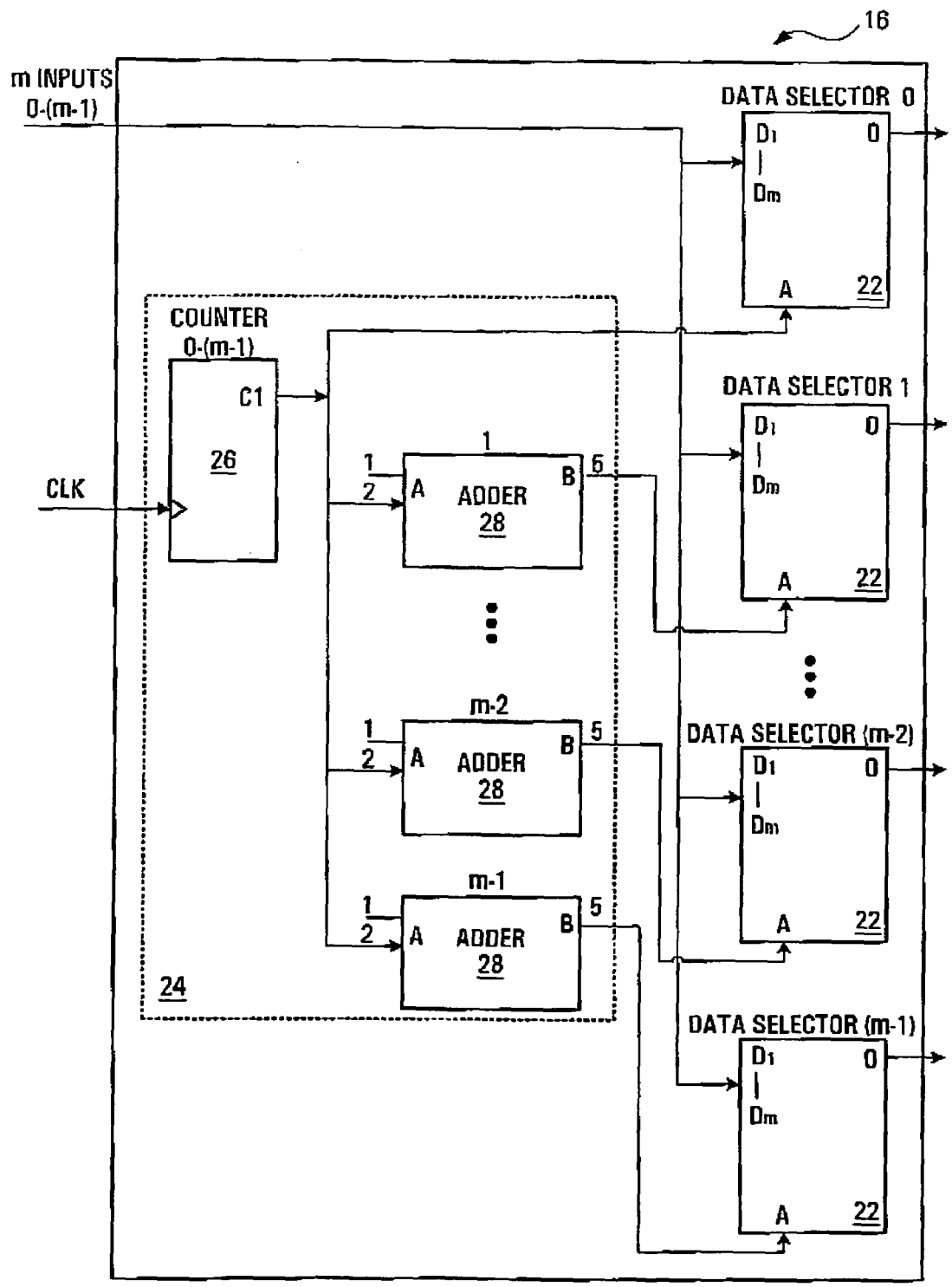
FIG. 2 illustrates a commutator forming part of the switch of FIG. 1.

Example egress and ingress commutators may be formed using simple logic blocks. FIGS. 2 is a simplified block diagram of an example m×m ingress commutator 16. As illustrated, the m×m ingress commutator 16, may be formed by combining m data selectors 22 (collectively and individually 22), each having m data inputs ($D_1$–$D_m$) and a single output (O). Each of the m inputs to each of the data selectors receives one of the m commutator inputs. Each data selector provides a single one of its m inputs ($D_1$–$D_m$) at its one output O. Which of the m inputs ($D_1$–$D_m$) is presented at a corresponding output O is controlled by a select input (A) to that data selector. Typically, the select input A to each data selector will have [$\log_2 m$] input lines.

The binary value at these input lines of select input A selects which of inputs $D_1$-$D_m$ is presented at output O. An addressing circuit 24 in turn, includes a counter 26, and m−1 adders (collectively and individually adder 28), interconnected with the output of the counter. Addressing circuit 24 produces m multi-bit outputs, one corresponding to the value (in binary) of the counter 26, and one corresponding to each of the value of the counter 26 incremented by 1, 2 . . . m−1, by a corresponding one of adder 28. All outputs are provided modulus m. Specifically, this is achieved using adders 28 that sum a preloaded value between 1 and m−1, and the output of counter 26. As such, each one of adders 28 provides the output of the counter, incremented by 1, 2, . . . and m−1, respectively. The select input A of one of each of the m data selectors (data selector 0) is connected directly to the outputs of counter 26. The select input A of each of the remaining data selectors 22 is connected with outputs of one of the m−1 adders 28. As such, each of the m data selectors outputs a distinct one of the m inputs, as controlled by counter 26 and/or one of adders 28. Thus, the state of addressing circuit 24 (controlled by the state of counter 26) controls the state of commutator 16. As the counter 26 cycles from 0 to m−1, by clock pulses at its CLK input, commutator inputs to outputs are cyclically interconnected. Depending on the direction of interconnection in a cycle, commutator 16 is said to rotate clockwise or counter-clockwise. For clockwise rotation, counter 26 may count down. For anti-clockwise counter 26 may count up. Cyclic interconnection of an exemplary four input to four output ingress commutator are illustrated in FIG. 4A, and detailed below.

Egress commutator 20 (FIG. 1) may be formed in much the same way as ingress commutator 16, having m inputs and n outputs. Addressing circuit of commutator 20 (like addressing circuit 24 (FIG. 2) of ingress commutator 16) may be adapted to rotate egress commutator inputs to outputs in the opposite direction as the corresponding counting circuit 24 of ingress commutator 16. Counter 26 could thus be a count-up counter.

A commutator circuit, as illustrated, may be embodied in many other ways. For example, addressing circuit 24 could be formed in many ways. Adders 28 could be replaced with memory units, storing interconnection sequences for each of data selectors 22. Alternatively, an m×m space switched may be controlled to act as commutator. It may be formed as an application specific integrated circuit, or a portion of such an integrated circuit. A person of ordinary skill will appreciate numerous other ways of forming a commutator.

Ingress commutator 16 and egress commutator 20 provide data to, and obtain data from, tandem buffers 18. Each of tandem buffers 18 (FIG. 1) is a store and forward buffer, capable of storing n single information units switched through switch 10. Tandem buffers 18 thus define m×n information storage locations or slots. In the embodiment of FIG. 1, each information storage location of tandem buffers 18 stores and forwards one information unit.

Each one of the m tandem buffers 18 is connected with one of the m outputs of ingress commutator 16, and one of the inputs of egress commutator 20. A selected one of the n storage locations of a connected tandem buffer 18 is provided with an information unit at the connected output of ingress commutator 16. As commutator 16 connects its inputs to its outputs, this tandem buffer 18 will, in turn, be provided with the information unit at the input buffer interconnected with this output of ingress commutator 16.

Another selected one of the n storage locations of tandem buffer 18 forwards an information unit within it to the connected input of egress commutator 20. An output buffer 14 interconnected to this input of egress commutator 20 will receive data from this storage location.

As such, at any point in time, information units within the m input buffers 12 may be loaded from the outputs of ingress commutator 16 into m of the m×n storage locations within the m tandem buffers. As many as m information units may be loaded into m tandem buffers 18 within one clock cycle. If a buffer storage location is occupied, as may be the case when switch 10 switches packets, data at input buffer 12 may need to remain queued. At the same time, n of m×n locations within buffers 18 are loaded into the n output buffers by way of output commutator 20, forwarding n information units to output buffers 14.

In a subsequent clock cycle, commutator 16 cycles inputs to outputs in a clockwise direction, egress commutator 20 cycles inputs to outputs in a counter-clockwise direction. Preferably, ingress commutator 16 and egress commutator 20 transition states synchronously. Then, up to m new information units may be loaded from input buffers 12 into tandem buffers 18, and n may be unloaded from tandem buffers 18.

Routing of information units from input buffers 12 to output buffers 14 may be controlled in any number of ways. For example, connection memory (not shown) may control the interconnection of storage locations within each tandem buffer 18 to output buffer 14. So, information units from the kth one of input buffers 12 may consistently be loaded into the kth location of the currently interconnected example tandem buffer 18. Connection memory may store a mapping of the kth location to the jth output. At a later time, when the example tandem buffer is interconnected with the jth output buffer 14, its kth storage location may be unloaded. This approach may conveniently be used for semi-static interconnections between input buffers 12 and output buffers 14.

Alternatively, information units may be routed by consistently connecting the jth output buffer 14 to the jth location of an interconnected one of tandem buffers 18. Switch 10 may load information units into tandem buffer 18 in dependence on their desired destination. Thus, an information unit destined for the jth output buffer may be loaded from an input buffer 12 to the jth location of a tandem buffer 18 currently interconnected with the input buffer. Once this tandem buffer 18 is interconnected with the jth output buffer 12 its jth storage location may be unloaded. The latter approach may conveniently be used to switch packets, or similar information units. Destination information within each packet may be examined as the packet arrives. The information unit is an encapsulation of the data. For example, a header of each information unit may be created at input buffer 12 from information contained in a packet encapsulated in the information unit. For example a packet's IP address may be translated into an address of the switch port (0 to N−1) to which the packet (and the corresponding information units) should be routed. This destination information may be used to transfer the packet from the input buffer 12 to the corresponding location within the then interconnected tandem buffer 18. At a later time, that information storage location may be unloaded to desired destination output buffer 14.

If switch 10 is used to switch packets, queued packets are only transferred to an interconnected buffer whose storage location associated with the packet's destination is available. In the event the destination location for an information unit of an interconnected buffer is not available, the information unit remains in the buffer until a buffer with the storage location of the destination unit becomes available. Typically, a rotator switch used to switch packet includes more tandem buffers than inputs and outputs. As well, such a switch operates synchronously at a higher rate than the arrival rate of packets at ingress buffers. By choosing an appropriate operating rate and number of buffers, a rotator switch may switch packets with a tolerable delay.

As each tandem buffer has n locations, one corresponding to each output buffer 14, and switch 10 includes m tandem buffers, one corresponding to each input buffer 12 switch 10 lends itself to use as a non-blocking circuit switch. Commutators 16 and 20 cyclically connect to each tandem buffer 18 to ensure that a different one is used for each input buffer 12 and each output buffer 14 in each time interval. After m clock cycles an input buffer is re-connected to the same tandem buffer. After n time clock cycles an output buffer is re-connected to the same tandem buffer.

Figure 3:
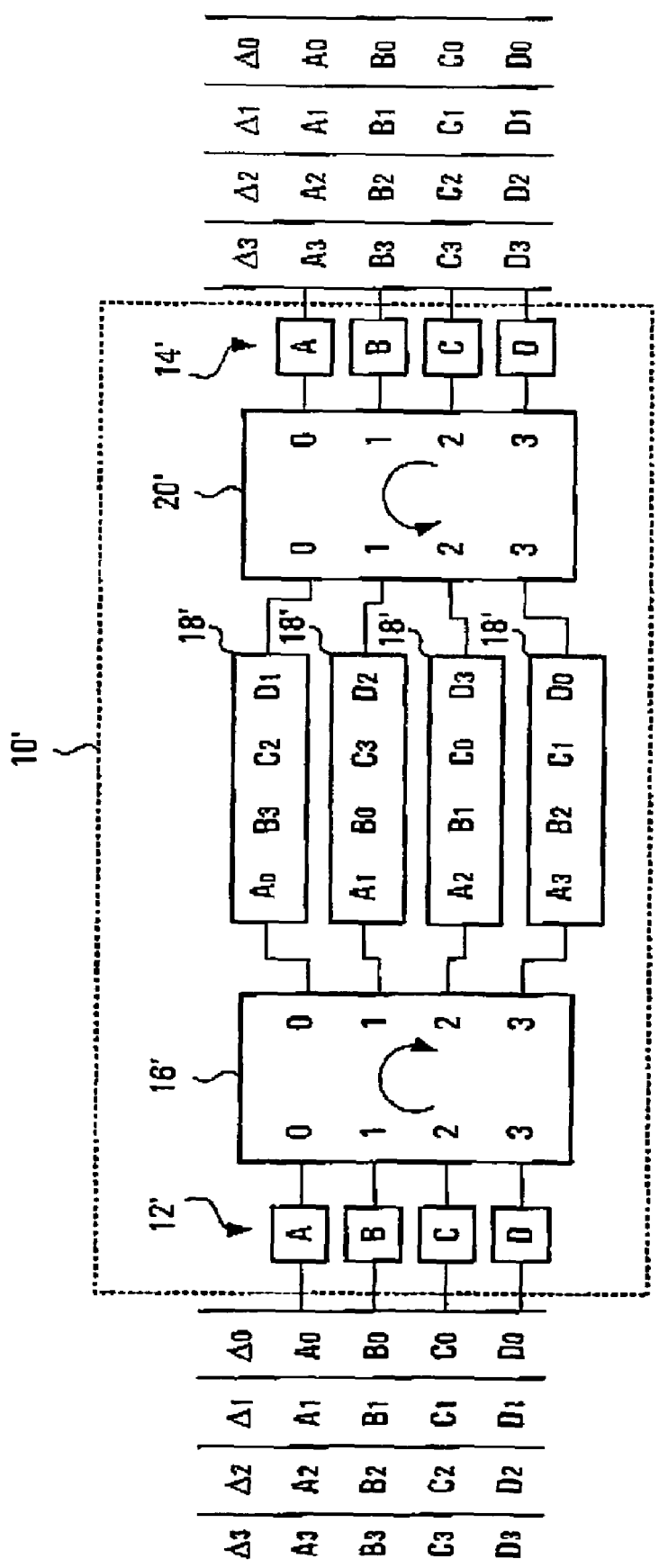
FIG. 3 illustrates a conventional rotator switch of the type illustrated in FIG. 1, in operation.

For clarity, FIG. 3 illustrates the travel of sixteen information units through a 4×4 rotator switch 10' used as a circuit switch. Switch 10' is an example switch of the type illustrated in FIG. 1. Example embodiments of elements generically described in FIG. 1 are annotated with the same numerals as in FIG. 1, but with a prime (') symbol. Input buffers 12' and output buffers 14' are individually identified using letters A,B,C and D. Information units arriving at input buffer A in time intervals one, two, three and four ($\Delta 0$, $\Delta 1$, $\Delta 2$, and $\Delta 3$) are identified as A0, A1, A2, and A3. Information units arriving at input buffers B, C, D in time intervals one, two, three and four ($\Delta 0$, $\Delta 1$, $\Delta 2$, and $\Delta 3$) are similarly identified.

For ease of illustration, example information units in FIG. 3 are routed from input buffer A to output buffer A; from input buffer B to output buffer B; from input buffer C to output buffer C; and from input buffer D to output buffer D. Switch 10' routes data using the first technique described above: all data from the jth input buffer 14' is assumed to be destined for the same output buffer, and is placed into the jth location within each tandem buffer 18'. A connection memory (not shown) controls the mapping of input buffers to output buffers. Input commutator 16' and output commutator 20' are clocked in synchronism with each other by clocking addressing circuits of commutators 16' and 20' (like addressing circuit 24 of commutator 16) by a common source.

So, in the first interval ($\Delta 0$), tandem buffers 18' load information units A0, B0, C0, and D0 into the first (corresponding to output buffer A), second (corresponding to output buffer B), third (corresponding to output buffer C); and fourth (corresponding to output buffer D) storage locations of the first, second, third and fourth tandem buffers 18', respectively, as illustrated. In this same interval, egress commutator 20' interconnects the first, second, third and fourth locations of the first (A), second (B), third (C) and fourth (D) tandem buffers 18' to the first, second, third and fourth output buffers 14' so that the content of these locations may forwarded.

In the second interval ($\Delta 1$), tandem buffers 18' load inputs A1, B1, C1, and D1 from input buffers 12' into the first, second, third and fourth locations of the second, third, and fourth and first tandem buffers 18', respectively. That is, upon transition from the first interval to the second interval, ingress commutator 16' has cyclically re-assigned its outputs in a downward (or clockwise) direction, (with input 0 connected to output 1; input 1 to output 2; input 2 to output 3; and input 3 to output 0). Egress commutator 20' similarly cyclically reassigns the interconnection of its inputs to its outputs upward (or counter-clockwise) (with input 0 connected to output 3; input 1 to output 0; input 2 to output 1; and input 3 to output 2). So, in this second interval ($\Delta 1$) switch 10' unloads the first, second, third and fourth storage locations from the second, third, fourth, and first tandem buffers 18' into the first, second, third and fourth output buffers 14'.

Third and fourth intervals ($\Delta 2$ and $\Delta 3$) are similarly illustrated, with ingress commutator 16' cyclically re-connecting its inputs to outputs, shifting them in a clockwise direction in each time interval; and egress commutator 20' cyclically re-connecting its inputs to outputs, shifting them in a counter-clockwise direction in each time interval.

For clarity, FIG. 4A illustrates the interconnection of inputs to outputs of ingress commutator 16' for the four time intervals. Similarly, FIG. 4B illustrates the interconnections of inputs to outputs of egress commutator 20' for the four time intervals.

As should now be appreciated, in the event one of tandem buffers 18 fails, output information units at all output buffers 14 will be corrupted.

Figure 5:
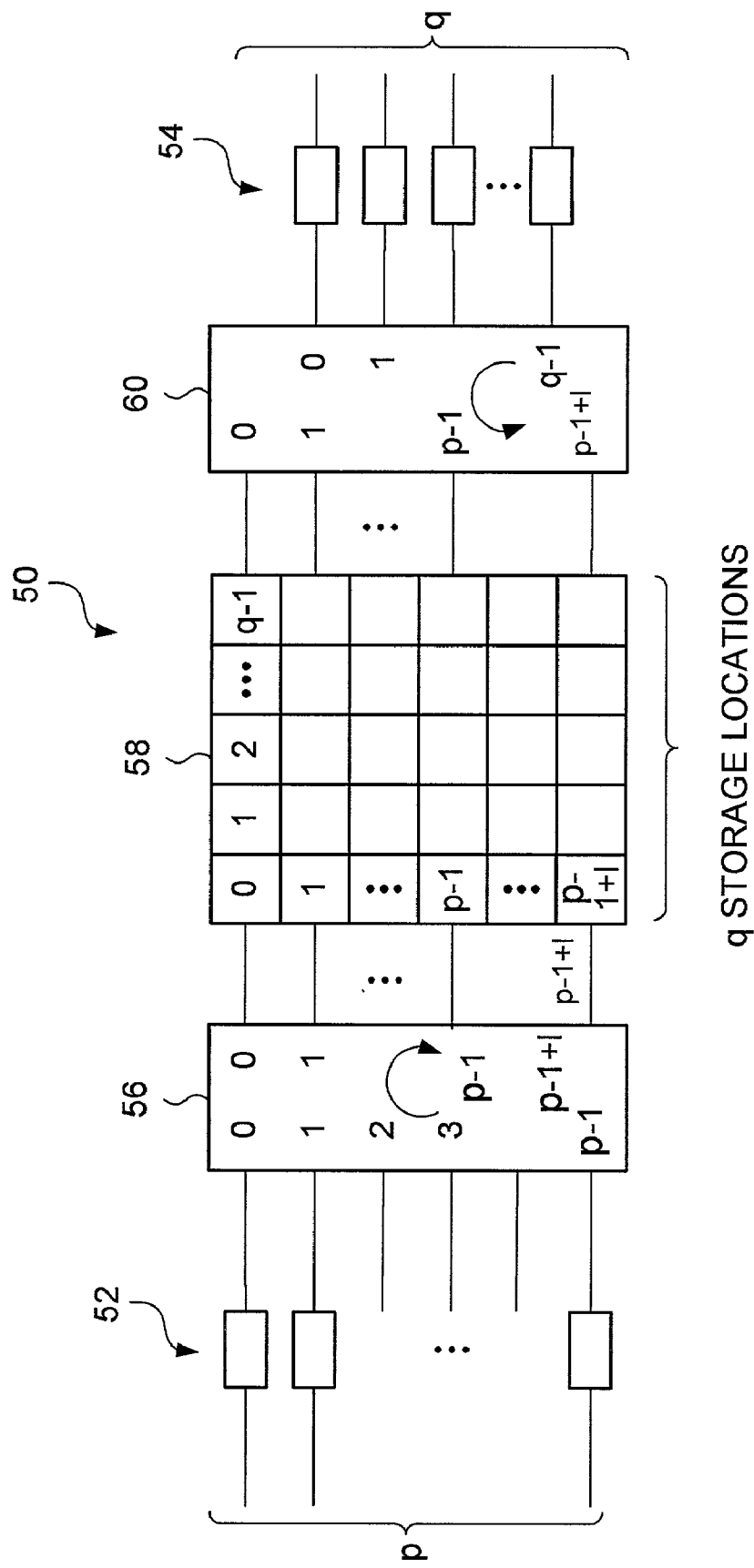
FIG. 5 is a block diagram of a rotator switch, exemplary of an embodiment of the present invention.

Now, FIG. 5 illustrates a rotator switch 50 exemplary of an embodiment of the present invention. Rotator switch 50, like switch 10, includes input buffers 52; ingress commutator 56; tandem buffers 58; egress commutator 60; and output buffers 54.

Ingress commutator 56 has p inputs and p+l outputs. Egress commutator 60 has at least p+l inputs and q outputs. Unlike switch 10 (FIG. 1), switch 50 switches only p inputs using p+l tandem buffers 58, each having q storage locations, to q outputs ($q \leq p$). Effectively then, and as will become apparent, l of the p+l tandem buffers 58 are redundant. Only p of the outputs of ingress commutator 56 are "active".

Ingress commutator 56 may be formed, in part, as a p state interconnect having p inputs and p active outputs. As with commutators 16, these p inputs may be interconnected with each of the p active outputs in p ways. Additionally, commutator 56 has l redundant outputs. These l redundant outputs each mirror one of the p active outputs. An interconnect connects each input to each output, as required.

Figure 6A:
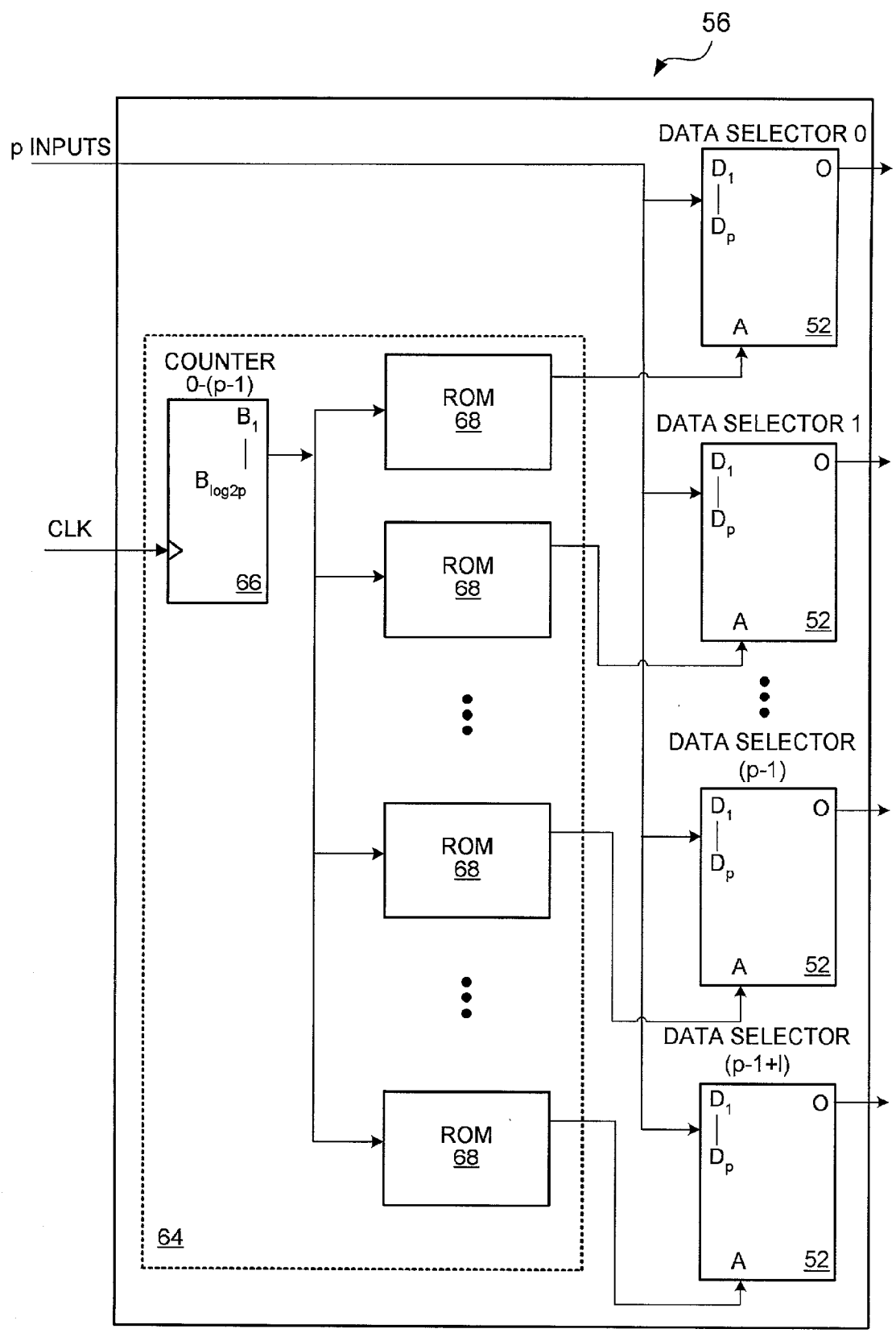
FIGS. 6A–6B and 7 illustrate components of the switch of FIG. 5.

Again, an example ingress commutator 56 may be formed using conventional logic blocks, as illustrated in FIGS. 6A. Specifically, as illustrated a p×(p+l) commutator 56 having l redundant outputs may be formed using p+l data selectors 62, each having p inputs ($D_1$–$D_p$) and one output (O). One input ($D_1$–$D_p$) of each of the p+l data selectors may be connected to one of the p commutator inputs. Each of the p+l selectors presents a selected one of the p inputs ($D_1$–$D_p$) at its output. Select lines (A) of the p+l data selectors may be interconnected to an addressing circuit 64, formed similar to addressing circuit 24 of commutator 16 (FIG. 2). As such, addressing circuit 64 receives a clock input to clock a counter 66. At its outputs, addressing circuit 64 presents p+l addresses provided to the address lines of the p+l data selectors 62. For flexibility, addressing circuit 64 uses memory elements 68 in place of adders 28. Address lines of the memory elements 68 are driven by counter 66. The contents of memory element 68 determines the interconnection of data selector inputs to outputs, for each clock cycle. Memory elements 68 may be read-only memory elements.

Figure 6B:
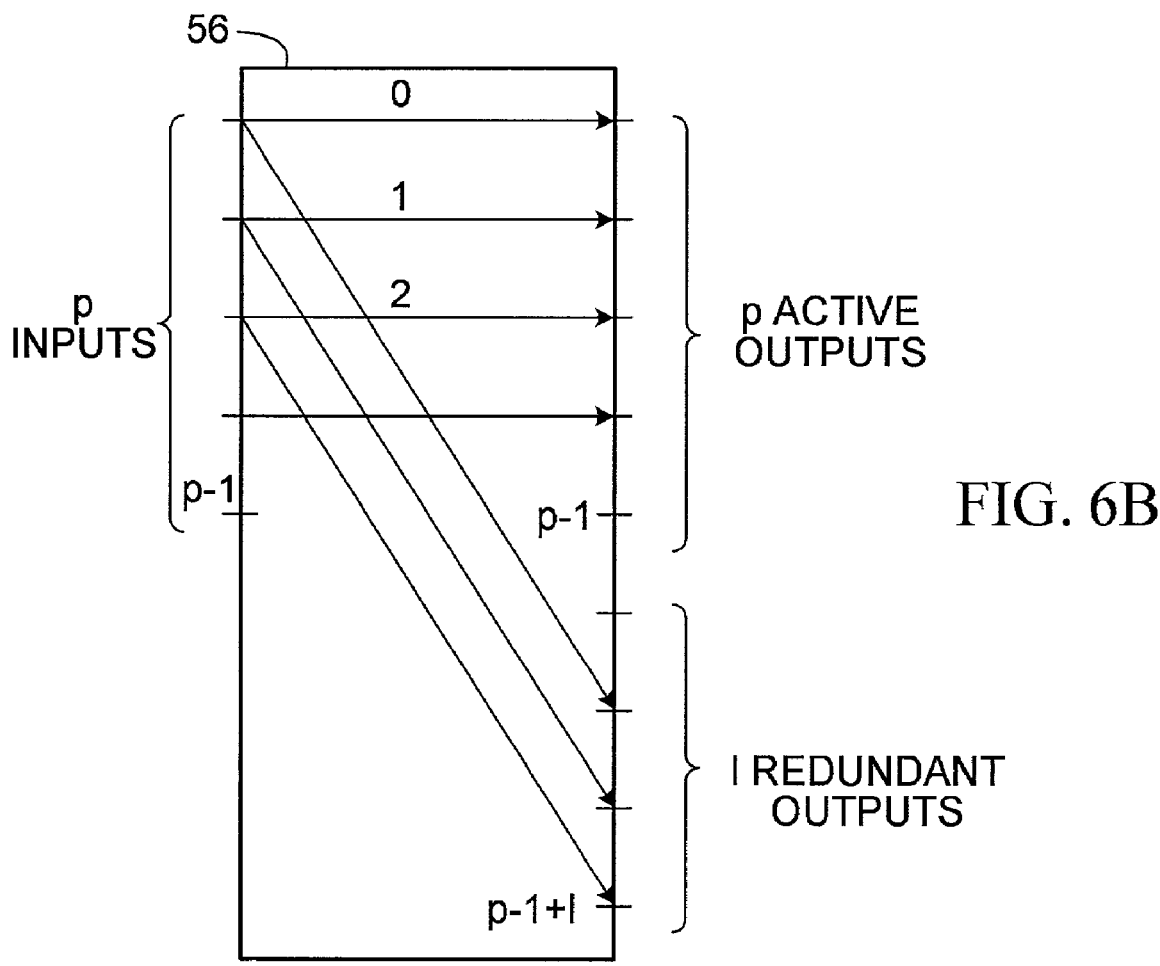

Ingress commutator 56 cyclically interconnects the p active inputs amongst its p active outputs, and replicates data at one or more of its p active inputs at its l redundant outputs. Ingress commutator 56 is therefore adapted to broadcast any one of its active inputs to more than one of its outputs. This allows information units at active inputs to be replicated at redundant outputs. An example interconnection of inputs to outputs for ingress commutator 56 is illustrated in FIG. 6B.

Figure 7:
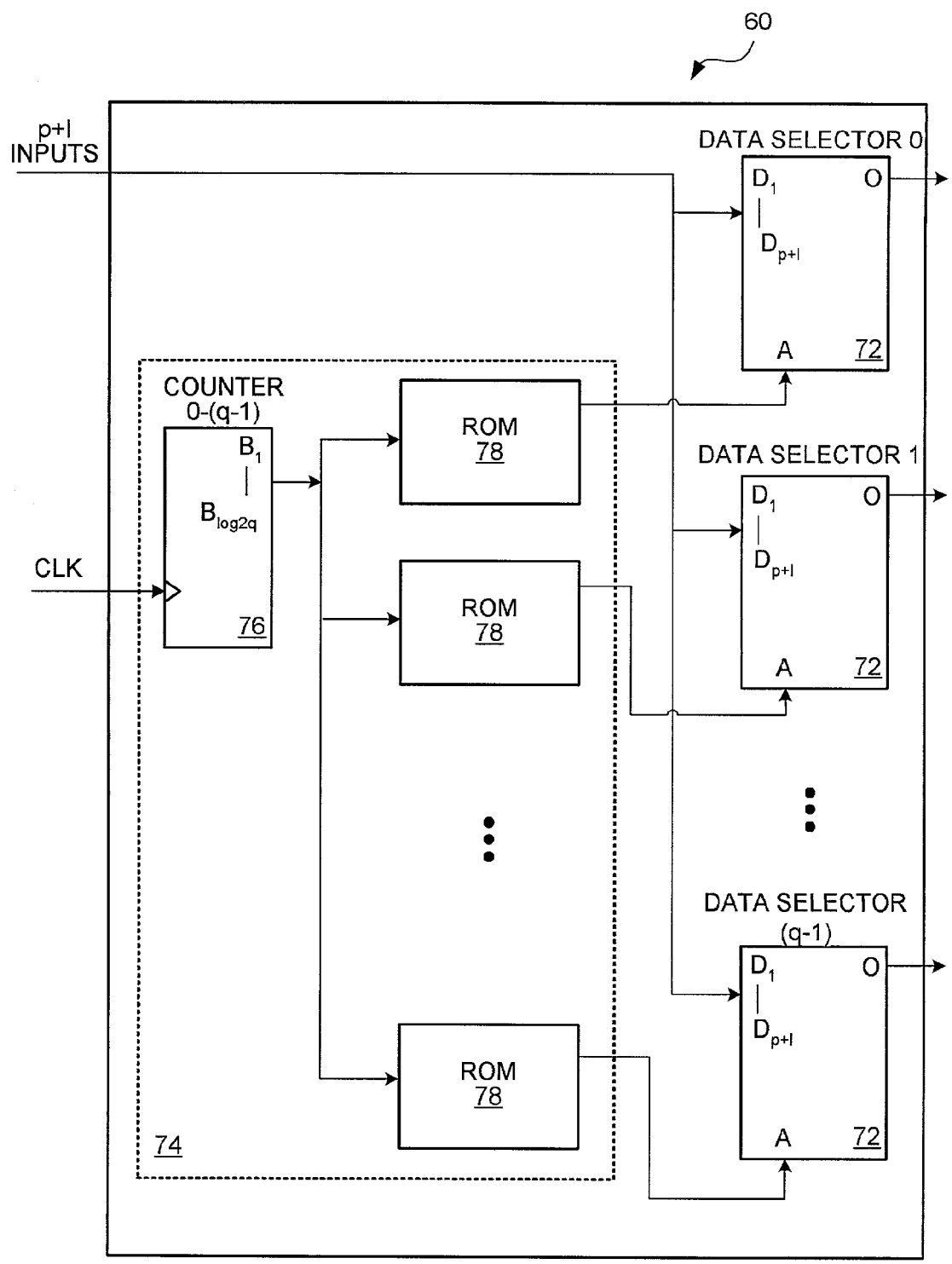

Egress commutator 60 may be formed as illustrated in FIG. 7 using q data selectors 72, each having p+l inputs and one output. Addressing circuit 74 includes q memory devices 78 having their address lines interconnected with clock 76, and their data lines interconnected with address lines of data selectors 72. Illustrated memory elements 78, like elements 68, are read-only memory programmed with input to output interconnections. Example values stored within each of memory devices 78 are detailed below.

In operation, switch 50 illustrated in FIG. 5 switches data from p input buffers 52 to q output buffers 54 in much the same way as switch 10 switches data from its m input buffers 12 to its n output buffers 14. Specifically, tandem buffers 58 load information units at each of the p input buffers 52 into an interconnected one of tandem buffers 58, based on the desired destination output buffer 54 for the information unit. Upon interval transitions, egress commutator 60 cyclically interconnects q of the tandem buffers 58 to output buffers 54. Each information unit is unloaded from a tandem buffer 58, when that tandem buffer is interconnected with the destined output buffer 54. The remaining l redundant outputs of ingress commutator 56 provide copies of information units at input buffers 52 to redundant tandem buffers 58.

So that the contents of a redundant one of tandem buffers 58 may mirror the contents of an active one of tandem buffers 58, the interconnection of each redundant output of ingress commutator 56 preferably mirrors the interconnection of an active output of ingress commutator 56. Thus, as an active tandem buffer is cyclically interconnected with all p active input buffers, a redundant tandem buffer mirroring the active tandem buffer is similarly cyclically interconnected with these p active input buffers. As such, the interconnection sequence for a data selector 62 (FIG. 6A) for a redundant output, stored within an associated memory element 68, will be the same as the interconnection sequence stored for a data selector for a corresponding active output.

The interconnection of each of the q outputs to p+l inputs of egress commutator is controlled by the contents of an associated memory element 78. Each of memory elements, in turn, may store a sequence of interconnects. For example, memory element 78 for data selector 0 may store values 0, 1, 2, . . . p, signifying interconnection of the first, second, and so on input in subsequent time intervals. Similarly, memory element 78 for data selector 1 may store values 1, 2, . . . p, 0. So configured, memory elements 78 act in the same way as adders 28 of commutator 16 (FIG. 2). Alternatively, memory elements 78 may store values representative of redundant inputs, thereby allowing each of selectors 72 to periodically select input from one of the l redundant inputs of commutator 60.

Figure 8:
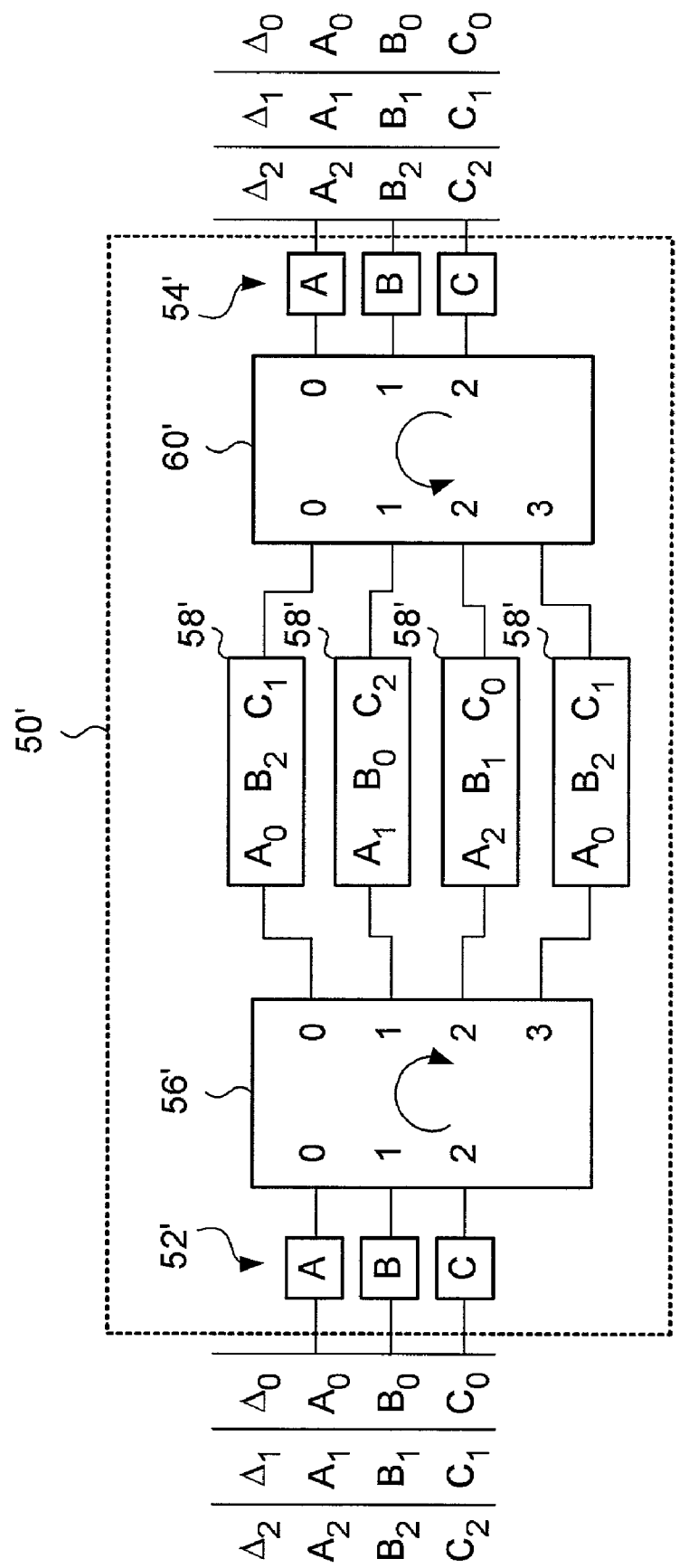
FIG. 8 illustrates an exemplary switch of the type illustrated in FIG. 3, in operation.

The operation of switch 50 may be better understood with reference to example switch 50' depicted in FIGS. 8, 9A and 9B. Switch 50' is of the same type as switch 50 of FIG. 5. Example embodiments of elements generically described in FIGS. 8, 9A and 9B are annotated with the same numerals as in FIG. 5, but with a prime (') symbol. Switch 50' includes only three input buffers 52', three output buffers 54' and four tandem buffers 58', including three active tandem buffers and one redundant tandem buffer. Input buffers 52' and output buffers 54' are individually identified using letters A, B and C. FIG. 8 illustrates the travel of nine information units through switch 50'. Information units arriving at input A in time intervals one, two, and three ($\Delta 0$, $\Delta 1$ and $\Delta 2$) are identified as A0, A1, and A2. Information units arriving at inputs B, and C in time intervals one, two, and three ($\Delta 0$, $\Delta 1$, and $\Delta 2$) are similarly identified. Switch 50' switches its three inputs (A,B,C) to three outputs (A,B,C), using four tandem buffers 58' each having three information storage locations. For clarity tandem buffers 58' are numbered 0,1,2 and 3. In the example embodiment, tandem buffers 0, 1 and 2 are active; tandem buffer 3 is redundant.

As illustrated, in FIG. 8 during a first time interval ($\Delta 0$), ingress commutator 56' provides information units A0, B0 and C0 at its active outputs (connected to buffers 0,1, and 2). The information unit at input A (A0) is again provided at the redundant output of ingress commutator 56' (connected to buffer 3). Tandem buffer 58', in turn loads data at the outputs of ingress commutator 56' into tandem buffers 0, 1, 2 and 3, respectively. The storage location within each tandem buffer 58' used for each output depends on the routing methods used by switch 50'. In the event the first above described technique is used, data is loaded into the first, second, third, and first locations of buffers 0,1,2 and 3, respectively, corresponding to the desired destination for the information units. In the second time interval $\Delta 1$, information units C1, A1, B1 are presented at the active outputs of ingress commutator 56', while information unit C1 is presented at the redundant output of ingress commutator 56'. In the third time interval ($\Delta 2$), information units B2, C2 and A2 are presented at the active outputs of ingress commutator, while information unit B2 is presented at the redundant output. As a result of replication of active inputs at the redundant output of ingress commutator 56', tandem buffer 3 will contain data identical to active tandem buffer 0, in these first three time intervals.

For clarity, FIG. 9A illustrates the interconnection of inputs to outputs of ingress commutator 56' for the three time intervals ($\Delta 0, \Delta 1$, and $\Delta 2$). FIG. 9B similarly illustrates the interconnection of inputs to outputs of egress commutator 60' for these intervals.

Egress commutator 60' provides data from active tandem buffers 58' at its outputs. Ingress commutator 56' could continue to provide duplicate data corresponding to data at one of its active output at its redundant output, until the redundant tandem buffer is required.

Memory element (like element 68 of commutator 56) for the four data selectors of commutator 56' associated with output 0, 1, 2, and 3 would store values 0,2,1; 1,0,2; 2,1,0; 0,2,1, respectively, to effect the illustrated interconnections. Memory elements (like elements 78 of commutator 60) for the three data selectors of egress commutator 60' would store values 0,1,2; 1,2,0; 2,0,1; respectively, to effect the illustrated interconnections. As such, counters of the addressing circuits of ingress and egress commutators (like counters 66 and 76) cycle from 0 to 2.

Preferably, however, redundant output of ingress commutator 56' is cycled so that it mirrors one active output, for three (i.e. p) time intervals. So, as illustrated in FIG. 8, in time intervals $\Delta 0$–$\Delta 2$, the redundant output of ingress commutator 56' is provided with a copy of the first active output of ingress commutator 56'. In time intervals $\Delta 3$–$\Delta 5$ (not illustrated), the redundant output of ingress commutator 56' mirrors the second active output. In time intervals $\Delta 6$–$\Delta 8$ (not illustrated), the redundant output of ingress commutator 56' mirrors the third active output. Each of three consecutive time intervals may be thought of as a protection phase. In each protection phase, the redundant tandem buffer is provided with information units destined for a different one of the active tandem buffers. In intervals $\Delta 9$, and onward the protection phases are repeated. Generally, for a switch having p active tandem buffers, each protection phase may last p cycles.

To achieve this memory element (like element 68 of commutator 56) for the four data selectors of ingress commutator 56' may store values 0,2,1,0,2,1,0,2,1; 1,0,2, 1,0,2, 1,0,2;2,1,0,2,1,0,2,1,0 and 0,2,1,1,0,2,2,1,0 respectively, to effect the illustrated interconnections. The associated counter of the ingress commutator 56' (like counter 76), in turn, would count from 0–8.

As should be appreciated, if switch 50 (FIG. 3) includes multiple redundant tandem buffers (i.e. l>1), each one of the multiple buffers may mirror a different active buffer at any one time.

Now, conveniently, if in normal operation any one of the p active tandem buffers 58 or an associated interconnection fails, information units carried by the failed active buffer may be carried by one of the l redundant buffers. So, for example if active buffer 2 of switch 50' fails, egress commutator 60' take its second input from one of the l redundant ones of tandem buffers 58', instead of buffer 2. As such, memory element (like memory element 68) of ingress commutator 56' associated with the output interconnected with buffer 3, in addition to storing its non-failed interconnection pattern, detailed above, may store an interconnection patterns identical to the interconnection pattern stored in memory elements associated with outputs to buffers 0, 1, and 2 at specified offsets. In response to detecting a failure of any buffer, address lines of this memory could be set so that the outputs of this memory are provided from locations with a suitable offset. Memory associated with each data selector of egress commutator 60' may store similar interconnection patterns, so that data is taken from the input provided by the redundant buffer. Specifically, for any one redundant output, an associated memory element (like element 78) stores a sequence of nine (q×q) values as described above. When running as an active output, a subset of q of the q×q values is used. This can be done by latching some of the address lines of the memory to fixed values, in place of the output of an interconnected counter (like counter 76). Conveniently, the q×q values may be stored within an associated memory element so that each protection phase may be separated in memory so that each protection phase may be chosen by freezing values of some of the address lines of the memory element. Depending on the timing ingress commutator 56' may immediately provide data destined for the failed tandem buffer to the redundant tandem buffer, or it may continue to cycle through protection phases, until the redundant buffer is provided with data identical to that destined for the failed tandem buffer. In the event the latter technique is used, ingress commutator 56' may have to wait p×p time intervals, until a redundant buffer is again provided with information units destined for the failed buffer.

In the event l>1, i.e. switch 50 includes multiple redundant buffers, ingress commutator 56 may compensate for multiple failed buffers (or connections thereto). Moreover, each of the protection phases of each of the l redundant buffers may be different.

In the described embodiment, failure of a redundant buffer may be difficult to detect. As such, switch 50 could optionally be adapted to perpetually switch output destined for one particular output buffer to any redundant tandem buffer. For example, a redundant buffer may be used to carry all data destined the first output of switch 50. Thus, the redundant buffer could be rotated to perpetually be interconnected to the output of ingress commutator 56 providing data destined for first output. A suitable pattern of interconnects may be stored within memory 68 associated with the redundant element. Now, an unused output (not shown) of egress commutator 60 could be perpetually interconnected with the redundant buffer. By comparing this egress commutator output to the contents of the first output, a fault in the redundant buffer may easily be detected. If one of the active buffers fails, hardware (or software and hardware) controlling the operation of ingress buffer 56 could again ensure that the redundant buffer mirrors the failed buffer.

Figure 10:
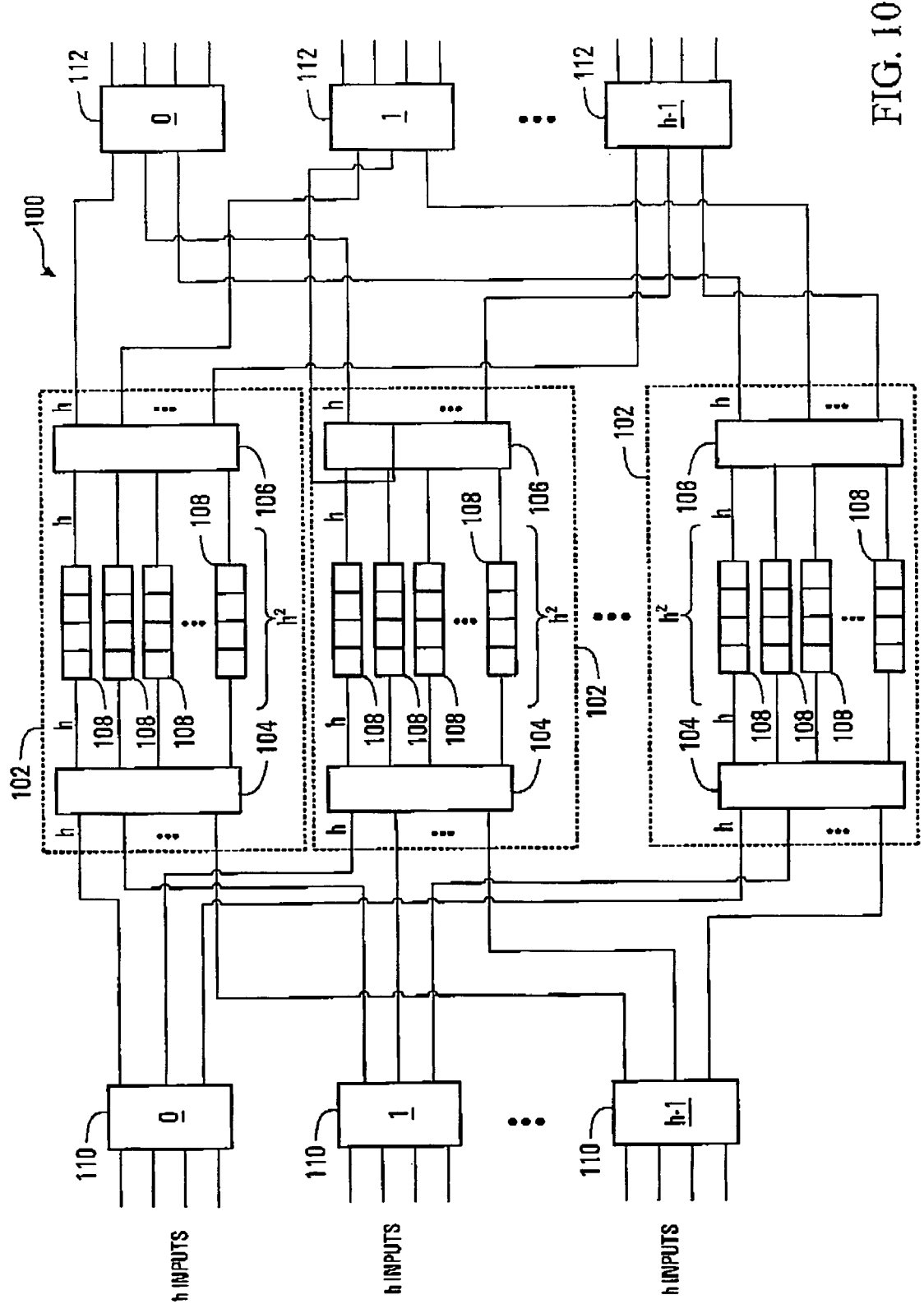
FIG. 10 is a block diagram of a further rotator switch, exemplary of another embodiment of the present invention.

FIG. 10 illustrates a further composite rotator switch 100, exemplary of another embodiment of the present invention. Switch 100 includes h+1 switching blocks 102, each including an ingress commutator 104, egress commutator 106 and a plurality of tandem buffers 108. For reasons that will become apparent, in the illustrated embodiment, the first h switching blocks are active switching blocks, while the final switching block is a redundant switching block. Each of switching blocks 102 is preferably an h input, h output switching block formed having a structure similar to that of switch 10 or switch 50 of FIG. 1 or 5. Each ingress commutator 104 therefore includes h active inputs and h active outputs. Similarly, each egress commutator 106 includes h active inputs and h active outputs. For reasons that will become apparent, however, each of the h tandem buffers 108 of each switching block 102, has $h^2$ storage locations. Optionally, if each switching block 102 is formed in a manner similar to switch 50, each set of tandem buffers 108 of each switching block 102 may include additional redundant tandem buffers (not shown), also having $h^2$ storage locations. Each ingress commutator 104 may thus also include a plurality of redundant outputs, while each egress commutator 106 may include a plurality of redundant inputs. (not shown).

Switch 100 further includes a second outer stage of h ingress commutators (individually and collectively 110), and an additional outer stage of h egress commutators (individually and collectively 112). Each of outer ingress commutators 110 includes h inputs and h+1 outputs, including h active outputs; and one (1) redundant output. Each of the h outer egress commutators 112 includes h outputs, and h+1 inputs, including h active inputs and a redundant input. Switch 100 may further include a plurality of $h^2$ input buffers (not shown) similar to input buffers 12 or 52 (FIG. 1 or 5), each of which is interconnected to one input of outer ingress commutators 110. Similarly, switch 100 may include of $h^2$ output buffers (also not shown), each interconnected to one output of outer egress commutators 112.

Each active output of each outer ingress commutator 110 is interconnected with a single input of a single one of the active h switching blocks 102. As each outer ingress commutator has h active outputs, each outer ingress commutator has one active output connected to each active switching block 102. The remaining redundant output of each ingress commutator 110 is interconnected with an input to the redundant one of switching blocks 102.

As illustrated, one output of each of the h active switching blocks 102 is interconnected with a single one input of each outer egress commutator 112. As each outer egress commutator 112 has h active inputs, each outer egress commutator receives an output from each of the active switching stages 102. Each output of the redundant one of switching stages 102 is interconnected to the one remaining redundant input of the outer egress commutators 112.

As will become apparent, the combination of two stages of outer ingress commutators 110, and (inner) ingress commutators 104, effectively creates an h×h ingress commutator. Similarly, the combination of two stages of outer egress commutators 112, and (inner) egress commutators 106, effectively creates an h×h egress commutator. Each of inner ingress commutators 104 cyclically interconnects its active inputs to its active outputs, in the same manner as each ingress commutators 56 (FIG. 5) connects active inputs to outputs. Each of outer ingress commutators 110 similarly cyclically interconnects its active inputs to its active outputs. Each inner ingress commutator 104, however, cycles each active input to each active output in one time interval of the cycle of an outer ingress commutator 110. That is, each output of each inner ingress commutator 104 is interconnected to all its inputs, while the interconnection of each outer ingress commutator 110 inputs to outputs remain static. Egress commutators 106 cycle inputs to outputs synchronously with ingress commutators 104. Outer egress commutators 112 cycle inputs to outputs synchronously with outer ingress commutators 110. Effectively, outer ingress commutators 110 and egress commutators 112 operate at a frequency of h interconnections/unit time, while inner commutators 104 and 106 operate at a speed of h×h interconnections/unit time. Conveniently, each inner commutator cyclically changes interconnections at the same rate information units are provided to inputs of outer ingress commutators 110. Thus, within one complete cycle of each outer ingress commutator 110, each input will be connected to each of the $h^2$ active tandem buffers. As each tandem buffer has h×h storage locations, information units may be switched in the manner described with reference to switch 10 or switch 50.

Now, since each outer ingress commutator 110 includes a redundant output, one active output of each outer ingress commutator 110 may be mirrored at its redundant output, and provided to one of the tandem buffers of redundant switching block 102. Conveniently, as each of the active ones of switching blocks 102 is only provided with data from a single active output of each outer ingress commutator 110, the redundant one of switching blocks 102, may be cumulatively provided with information units identical to those provided to any active switching block. That is, the redundant switching block may mirror an entire one of the active switching blocks at any given time.

Although switch 100 includes a single redundant switching block, it will readily appreciated that switch 100 could easily be modified to include an arbitrary number (z) of redundant switching blocks.

In operation, switch 100 serves to switch $h^2$ inputs to $h^2$ outputs, preferably by way of input and output buffers (not shown). Redundant outputs of outer ingress commutators 110 cause a single output of each commutator 110 to be replicated at an input to the redundant one of switching blocks 102. Switching between the $h^2$ inputs and $h^2$ outputs is effected in much the same way as switch 10 effects switching between its n inputs and m outputs. That is, information units are loaded from inner ingress commutators 104 into storage units of interconnected tandem buffers, in dependence on the desired destination outputs for the information units. As noted, the combination of inner and outer ingress commutators 110 and 104, and the combination of inner and outer egress commutators 112 effectively provides an h×h ingress commutator and an h×h egress commutator.

If each of switching blocks 102 includes redundant tandem buffers (not shown), redundant outputs of each inner ingress commutator 104 may be switched through redundant buffers of each switching block 102, to redundant inputs of egress commutators 106. In the event of failure of a single tandem buffer 108 within a particular one of swithcing blocks 102, ingress commutator 104 and output commutator 106 of that switch may cause a redundant buffer of that switch to be used in place of the failed active buffer, in same manner as switch 50 may replace an active tandem buffer with a failed tandem buffer.

In the event of failure or replacement of an entire switching block 102, outer stage ingress commutators 110 may provide information units previously destined for the failed/replaced switch to the redundant one of switching blocks 102. Again, this may be effected using a suitably programmed memory associated with the redundant output of each of ingress commutators 110. Similarly, using suitable programmed memory, outer egress commutators 112 may take information previously provided at an active input, from their redundant input, thereby taking data from the redundant one of switching blocks 102.

Figure 11:
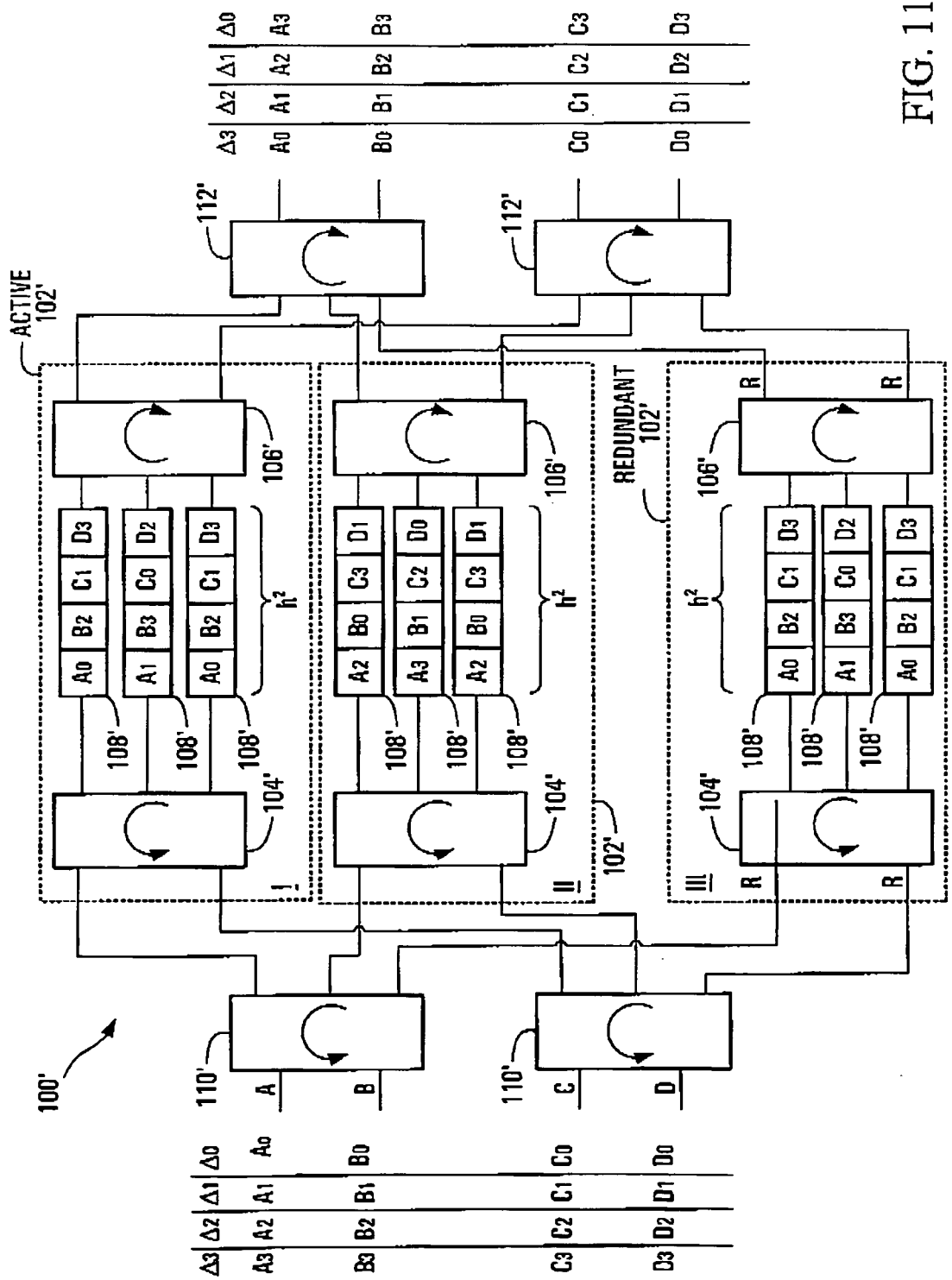
FIG. 11 illustrates an exemplary switch of the type illustrated in FIG. 10, in operation.

The operation of switch 100, may be better appreciated with reference to FIG. 11, illustrating an example switch 100' including four active inputs (ABCD), and four active outputs. Travel of information units from these inputs to these outputs is illustrated for four time intervals (Δ0,Δ1,Δ2, and Δ3). In the example, information units originating from each of inputs A, B, C, and D is assumed destined for outputs A,B,C, and D respectively. Again information units over four time intervals are represented as A0, A1, A2, A3; B0, B1, B2, B3; C0, C1, C2, C3; and D0, D1, D2, D3.

Exemplary switch 100' includes three switching blocks 102'. For ease of reference, switching blocks 102' are identified with roman numerals I, II, and III. Each switching block 102' includes an inner ingress commutator 104', in communication with three tandem buffers 108'; in communication with an egress commutator 106'. Each of inner ingress commutators includes two active inputs; two active outputs; and one redundant output. Each of inner egress commutators 106' includes two active outputs; one redundant input, and two active outputs. Each tandem buffer 108' includes four ($2^2$) storage locations. For reasons that will become apparent the bottom illustrated switching block 102' (switching block III) may be referred to as redundant switching block.

Now, information units A0 and C0 arriving at inputs A and C in the first time interval are placed in slots one and three of buffers 0 and 1 of switching block I. Information units B0 and D0 arriving at inputs B and D in this first time interval are placed into the second and fourth slots of the first two tandem buffers of switching block II. Inner commutators 104 cyclically interconnect their active inputs to active outputs, in the same manner as commutators 56 (FIG. 5), at the transition of each time interval. Outer egress commutators 112' and outer ingress commutators 110' cycle at half the speed of the inner commutators 104'. As a result, information units A1 and C1, are placed into the first and third slots of the tandem buffers 1 and 0, respectively, of switching block I. Information units D1 and B1 are placed into the fourth and second slots of the first two tandem buffers, respectively, of switching block II.

After the arrival of two information units at each input of outer ingress commutators 110', connection of inputs to active outputs of outer ingress commutator 110' are rotated cyclically among active inputs to that ingress commutator 110'. So, information units B2 and D2 are placed within the second and fourth slots of the tandem buffers 0 and 1 of switching block I, respectively. Information units A2 and C2 are placed within the first and third slots of the tandem buffers 0 and 1 of switching block II. In the next time interval, information units C3 and A3 are loaded into the third and first slots of tandem buffers 0 and 1 of switching block II. Information units B3 and D3 are loaded into the second and fourth slots of tandem buffers 1 and 0 of switching block I.

Tandem buffers 108' similarly unload data to an interconnected output through interconnecting egress commutators 106' and 112'. Thus, in the first time interval (Δ0) output A is provided with the information unit in the first slot, of tandem buffer 0, of switching block (i.e. information unit A0); output B is provided with the information unit in the second slot, of tandem buffer 0, of switching block II(i.e. information unit B0); output C is provided with the information unit in the third slot of tandem buffer 1, of switching block I(i.e. information unit C0); and output D is provided with the information unit in the fourth slot of tandem buffer 1 of switching block II. The travel of information units to outputs A,B,C,D in subsequent time intervals may ascertained with reference to the illustrated contents of buffers 108'.

Redundant output of outer ingress commutators 110' provide data identical to that provided to switching blocks 1 to switching block III. As such, tandem buffers 108' of switching block III mirror tandem buffers of switching block I to inputs and thus outputs of the egress commutator 106' of redundant switching block 102'. Thus, in the event of failure or replacement of switching block I, each of outer egress commutators 112' may present data from its redundant input in place of information units received from switching block I. Thus, switching block I may effectively be replaced by redundant switching block III.

Of course, absent a failure, switching block III need not mirror switching block I. Instead, redundant outputs of commutators 110' may cyclically cause redundant switching block III to periodically mirror each of the active switching blocks. Again, this may be effected using storage of proper interconnection patterns within memories governing the interconnection of commutators 110'.

Further, the final tandem buffer (i.e. tandem buffer 3) of each of switching blocks 102' (i.e. switching block I, II, and III) may be redundant within each switching block 102'. Inner ingress commutator 104' and inner egress commutator 106' may, in turn, provide and take redundant data to and from the redundant buffer, in much the same way as information units are provided to and taken from the redundant buffers of switch 50. In this way, a local failure of a tandem buffer within any of switching blocks 102' may be protected by a redundant tandem buffer forming part of that switching block.

As should now be appreciated, many variations to the above described embodiments are possible. Commutators 56, 60, 104, 106, 110, and 112 may be formed in many ways. As noted, commutators 56, 60, 104, 106, 110, and 112 could be formed using space switches; conventional logic circuits; processors; or in any other numerous ways appreciated by those of ordinary skill. The location of redundant buffers, and redundant switching blocks within each switch is arbitrary and could be controlled by software controlling interconnecting commutators. The number of redundant buffers within a switch or switching block is a matter of design choice. Similarly, the number of redundant switching blocks for a multistage commutator switch is a matter of design choice.

Of course, the above described embodiments, are intended to be illustrative only and in no way limiting. The described embodiments of carrying out the invention, are susceptible to many modifications of form, arrangement of parts, details and order of operation. The invention, rather, is intended to encompass all such modification within its scope, as defined by the claims.

What is claimed is:

1. A communications switch for switching information units between inputs and outputs, said switch comprising:
   p inputs each for receiving information units;
   q outputs;
   p+l buffers, each of said buffers comprising q storage locations, each one of said storage locations for storing one of said information units, wherein p of said p+l buffers are active buffers, and l of said p+l buffers are redundant buffers;
   an ingress commutator, for interconnecting each of said p inputs to at least one of said pbuffers;
   an egress commutator for interconnecting each of said q outputs to a select one of said p+l buffers;
   said ingress commutator operable to cyclically interconnect each of said p inputs to each of said p active buffers to provide data from said each of said p inputs to said p active buffers, and to interconnect at least one of said l redundant buffers to said p inputs to replicate data in one of said p active buffers within said at least one of said l redundant buffers; and said egress commutator operable to interconnect each of said q outputs to one of said p+l buffers to provide data from said p inputs to said q outputs wherein p, q, and l are positive integers.

2. The switch of claim 1, wherein, upon detecting a fault associated with a specific one of said active buffers, said ingress commutator is operable to provide information units destined for said specific one of said active buffers to said one of said l redundant buffers; and said egress commutator is operable to provide information units from said one of said l redundant buffers to outputs of said egress commutator, in place of information units from said specific one of said active buffers.

3. The switch of claim 2 further comprising:
   an output buffer connected to store information units from a storage location associated with a first one of said q outputs at each of said p active buffers;
   a redundant output buffer connected to store information units from a storage location associated with said first one of said q outputs at said one of said l redundant buffers;
   wherein a fault within said l redundant buffers is detected by comparing contents of said redundant output buffer with contents of one of said q outputs.

4. The switch of claim 1, wherein data within said one of said l redundant buffers periodically mirrors data within each of said p active buffers.

5. A communications switch for switching information units between inputs and outputs, said switch comprising:
   h+z switching blocks, each of said h+z switching blocks comprising:
      h inputs;
      h outputs:
      h buffers, each of said buffers comprising h storage locations, each one of its h storage locations for storing one of said information units;
      an ingress commutator, for cyclically interconnecting each of said h inputs to one of said h buffers;
      an egress commutator for cyclically interconnecting each of said h buffers to one of said h outputs;
   h outer ingress commutators, each having h inputs, h active outputs and z redundant outputs;
   h outer egress commutators, each having h outputs, h active inputs, and z redundant inputs;

each of said h active outputs of said h outer ingress commutators is connected to one input of one of said h+z switching blocks;

each of said z redundant outputs of each of said h outer ingress commutators is connected to one input of a remaining one of said h+z switching blocks;

each of said h active inputs of each of said h outer egress commutators is connected to one of said outputs of one of h of said h+z switching blocks;

each of said z redundant inputs of each of said h outer egress commutators is connected to one of said h outputs of one of said remaining z of said h+z switching blocks; and said h outer ingress commutators are operable to provide data to each of said remaining z of said h+z switching blocks, to duplicate data provided to another one of said h+z switching blocks wherein h and z are positive integers.

6. The communications switch of claim 5, wherein each of said h+z switching blocks further comprises:

at least one redundant buffer, comprising h storage locations, each one of its h storage locations for storing one of said information units;

wherein an ingress commutator of each switching block is operable to cyclically interconnect each of its h inputs to one of its h buffers and to interconnect its at least one redundant buffer to its h inputs to replicate data in one of its h buffers within its at least one redundant buffer;

and wherein an egress commutator of each switching block is operable to interconnect each of its said h outputs to one of its said h buffers and its at least one redundant buffer, to provide data from its h inputs to its h outputs.

7. The communications switch of claim 5, wherein, upon detecting a fault associated with a specific one of said switching blocks, said h outer ingress commutators are operable to provide information units destined for said specific one of said switching blocks to one of said remaining z of said h+z switching blocks, and said h outer egress commutators are operable to provide information units from said one of said remaining ones of said h+z switching blocks in place of information units from said specific one of said active switching blocks.

8. A commutator comprising:

p inputs;

p+l outputs;

an interconnect, between said p inputs and said p+l outputs, said interconnect presenting p-l of said p inputs at p+l active outputs of said p+l outputs, and each one of l of the remaining ones of said p inputs at one of l active outputs and at a further one of l of said p+l outputs, said interconnect operable to cycle said p inputs amongst said p active outputs wherein p is a positive integer, and l is a positive integer less than p.

9. The commutator of claim 8, further comprising p+l memory elements, one associated with each of said p+l outputs, each of said memory elements storing data controlling interconnection of said poutputs to said p inputs.

10. A method of switching data between p inputs and q outputs, comprising:

cyclically connecting said p inputs to p active tandem buffers, each of said p active tandem buffers comprising q storage locations, to load data from said p inputs into said p active tandem buffers;

cyclically connecting said p active tandem buffers to said q outputs to unload one storage location of said each of said p active tandem buffers at one of said q outputs thereby switching said data;

cyclically connecting said p inputs to l redundant tandem buffers, each of said l redundant tandem buffers comprising q storage locations, to mirror data in l of said p active tandem buffers wherein p, q, and l are positive integers.

11. The method of claim 10 further comprising using at least one of said l redundant tandem buffers in place of one of said p active tandem buffers.

12. The method of claim 10 wherein, upon detecting a fault associated with a specific one of said p active tandem buffers, said method further comprises loading information units destined for said specific one of said active tandem buffers into one of said l redundant tandem buffers.

13. The method of claim 12, further comprising providing information units from said one of said l redundant tandem buffers, in place of Information units from said specific one of said active tandem buffers.

14. A communications switch for switching information units between inputs and outputs, said switch comprising:

p inputs, each of said p inputs for receiving said information units;

q outputs;

p+l buffers, each of said buffers comprising q storage locations, each of said q storage locations for storing one of said information units, wherein p of said p+l buffers are active buffers and l of said p+l buffers are redundant buffers;

means for cyclically interconnecting said each of said p inputs to at least one of said p+l buffers such that said each of said p inputs cyclically connects to each of said p active buffers to provide data from said each of said p inputs to said p active buffers, and such that at least one of said l redundant buffers cyclically connects to said each of said p inputs to replicate data in one of said p active buffers within said at least one of said l redundant buffers;

means for cyclically interconnecting each of said q outputs to selected buffers of said p+l buffers to provide data from said p inputs to said q outputs wherein p, q, and l are positive integers.

15. The switch of claim 1 wherein, upon detecting a fault associated with said one of said p active buffers, thereby leaving p−1 active buffers, said egress commutator is operable to cyclically connect each of said q outputs to said p−1 active buffers and said one of said l redundant buffers to provide information units, received from said p inputs and stored in said storage locations to said q outputs.

* * * * *